(12) United States Patent
Thompson (10) Patent No.: US 11,083,306 B1
(45) Date of Patent: Aug. 10, 2021

(54) READY TO ASSEMBLE BEDDING FOUNDATION WITH LOCKABLE CORNERS

(71) Applicant: L&P Property Management Company, South Gate, CA (US)

(72) Inventor: Seth A. Thompson, Carthage, MO (US)

(73) Assignee: L&P Property Management Company, South Gate, CA (US)

(*) Notice: Subject to any disclaimer, the term of this patent is extended or adjusted under 35 U.S.C. 154(b) by 100 days.

(21) Appl. No.: 16/751,367

(22) Filed: Jan. 24, 2020

(51) Int. Cl.
*A47C 19/02* (2006.01)
*A47C 31/02* (2006.01)

(52) U.S. Cl.
CPC .......... *A47C 19/024* (2013.01); *A47C 19/025* (2013.01); *A47C 31/023* (2013.01)

(58) Field of Classification Search
CPC .... A47C 19/024; A47C 19/025; A47C 31/023
See application file for complete search history.

(56) References Cited

U.S. PATENT DOCUMENTS

| | | | | |
|---|---|---|---|---|
| 3,683,429 A | * | 8/1972 | Mis | A47C 19/024 |
| | | | | 5/201 |
| 4,065,818 A | * | 1/1978 | Farina | A47C 19/021 |
| | | | | 248/188 |
| 5,012,538 A | * | 5/1991 | Timm | A47C 19/005 |
| | | | | 5/200.1 |
| 5,688,287 A | * | 11/1997 | Cline | A47B 91/022 |
| | | | | 108/154 |
| 5,709,500 A | * | 1/1998 | Mizelle | A47C 4/02 |
| | | | | 16/386 |
| 6,158,087 A | | 12/2000 | Cheung | |
| 6,832,397 B2 | | 12/2004 | Gaboury et al. | |
| D512,849 S | | 12/2005 | Mirchand | |
| 7,155,762 B2 | * | 1/2007 | Harrow | A47C 19/005 |
| | | | | 5/201 |
| D542,051 S | | 5/2007 | Boemer et al. | |
| D542,566 S | | 5/2007 | Boemer et al. | |
| D543,051 S | | 5/2007 | Kingsley et al. | |
| D599,199 S | | 9/2009 | Roberts et al. | |

(Continued)

OTHER PUBLICATIONS

U.S. Patent and Trademark Office; Search Report and Written Opinion in related International Patent Application No. PCT/US21/13857 dated Mar. 31, 2021; 10 pages.

(Continued)

*Primary Examiner* — David R Hare
*Assistant Examiner* — Alexis Felix Lopez
(74) *Attorney, Agent, or Firm* — Wood Herron & Evans LLP (57) ABSTRACT

A bedding foundation comprises a connector assembly and a stabilizer assembly at each corner of the product for joining perpendicular first and second trusses. Each stabilizer assembly comprises a first bracket secured to the first truss, a second bracket secured to the second truss and a leg assembly comprising a lag and a threaded rod. One of the first and second brackets has a threaded boss and the other of the first and second brackets has an opening aligned with the threaded boss. The threaded rod extends through the aligned threaded boss and opening of the first and second brackets and the leg abuts the lower bracket to support the foundation above the ground.

20 Claims, 10 Drawing Sheets

(56) References Cited

U.S. PATENT DOCUMENTS

| | | | |
|---|---|---|---|
| 7,703,155 B1 | 4/2010 | Roberts et al. | |
| D616,291 S | 5/2010 | Roberts et al. | |
| 7,900,300 B1 | 3/2011 | Roberts et al. | |
| D637,477 S | 5/2011 | Wall | |
| D653,939 S | 2/2012 | Roberts | |
| 8,122,537 B1 | 2/2012 | Roberts | |
| 8,147,012 B2 | 4/2012 | Green | |
| 8,584,277 B1 | 11/2013 | Roberts | |
| D712,727 S | 9/2014 | Geiger | |
| D716,136 S | 10/2014 | Roberts et al. | |
| 8,850,638 B1 | 10/2014 | Suh | |
| D717,158 S | 11/2014 | Roberts et al. | |
| D719,014 S | 12/2014 | Roberts et al. | |
| D722,864 S | 2/2015 | Greenthal | |
| 8,959,678 B2 | 2/2015 | Schulz, Jr. | |
| 8,990,979 B1* | 3/2015 | Craver | A47C 19/021 |
| | | | 5/400 |
| D731,881 S | 6/2015 | Roberts et al. | |
| 9,080,304 B1 | 7/2015 | Roberts et al. | |
| 9,139,332 B1 | 9/2015 | Roberts et al. | |
| D753,476 S | 4/2016 | Roberts et al. | |
| 9,352,875 B1 | 5/2016 | Roberts et al. | |
| 9,422,961 B1 | 8/2016 | Roberts et al. | |
| 9,538,851 B2* | 1/2017 | Craver | G06Q 30/0601 |
| 10,595,643 B2* | 3/2020 | Harrow | F16B 12/50 |
| 10,709,254 B2 | 7/2020 | Jewett et al. | |
| 10,722,044 B2* | 7/2020 | Jewett | A47C 7/35 |
| 2004/0181874 A1* | 9/2004 | Schuman | A47C 19/024 |
| | | | 5/201 |
| 2008/0078022 A1* | 4/2008 | Wecker | A47C 19/021 |
| | | | 5/1 |
| 2008/0208709 A1* | 8/2008 | Craver | B65D 85/70 |
| | | | 705/26.8 |
| 2009/0271925 A1 | 11/2009 | Felix | |
| 2010/0031440 A1* | 2/2010 | Harrow | A47C 19/005 |
| | | | 5/201 |
| 2013/0025050 A1* | 1/2013 | Syrowitz | A47C 19/025 |
| | | | 5/246 |
| 2016/0255963 A1* | 9/2016 | Jones | A47C 19/025 |
| 2017/0042336 A1 | 2/2017 | Craver | |
| 2017/0055715 A1 | 3/2017 | Rohr | |
| 2017/0065091 A1 | 3/2017 | Rodgers et al. | |
| 2017/0079443 A1* | 3/2017 | Craver | F16B 12/56 |
| 2017/0208955 A1* | 7/2017 | Lee | F16B 12/58 |
| 2018/0008049 A1* | 1/2018 | Shih | A47C 19/021 |
| 2018/0027977 A1* | 2/2018 | Shelby | A47C 23/062 |
| 2018/0344041 A1* | 12/2018 | Liu | A47C 19/027 |
| 2019/0021508 A1* | 1/2019 | Jewett | F16B 12/56 |
| 2019/0059601 A1* | 2/2019 | Kramer | A47C 19/024 |
| 2019/0125088 A1* | 5/2019 | Huang | A47C 19/025 |
| 2019/0142174 A1* | 5/2019 | Lee | F16B 12/58 |
| | | | 5/236.1 |
| 2019/0343293 A1* | 11/2019 | Oh | A47C 19/025 |
| 2019/0380500 A1* | 12/2019 | Oh | A47C 19/025 |
| 2020/0049183 A1* | 2/2020 | Zerillo | A47C 19/024 |
| 2020/0069068 A1* | 3/2020 | Hodgson | A47B 91/00 |

OTHER PUBLICATIONS

Zinus Vertical Wood Support Slats for Bed Frame / Bunkie Board / Box Spring Replacement, Queen' (Zinus), Jun. 1, 2018 (Jan. 1, 2018), [online], retrieved from <URL: <https://www.amazon.com/Zinus-Solid-Vertical-Support-Bunkie/dp/B07DGL74CK/ref.sr_I_42dchild=1&keywords.bed+slats+with+strap&qid=16147252>96&s.home-garden&sr=1-4>, entire document, especially p. 1.

\* cited by examiner

READY TO ASSEMBLE BEDDING FOUNDATION WITH LOCKABLE CORNERS

FIELD OF THE INVENTION

This invention relates generally to bedding and seating products and, more particularly, to a bedding foundation.

BACKGROUND OF THE INVENTION

Bedding and seating products often have a rectangular wooden frame comprising four or more pieces. Two of the pieces are side pieces, one is a head end piece and the last piece is a foot end piece. In some bedding foundations, the wooden pieces of the frame are oriented with the larger of their width and height dimensions facing up and down. In other bedding and seating products the frame pieces are oriented "on edge" with the lesser of their width and height dimensions facing up and down. Securing a wooden side rail oriented "on edge" to a wooden head or foot rail oriented "on edge" is difficult due to the orientation of the rails.

In today's world of ecommerce, bedding products which may be ordered online and shipped in boxes are desirable. The smaller the box, the more desirable for the customer, because in general smaller boxes are cheaper to ship. Bedding foundations present a unique challenge with regards to shipping due to their size and construction. The more desirable bedding foundations capable of shipment in a box must be ready to assembly by the customer at the point of delivery.

U.S. Pat. No. 8,990,979 discloses a ready to assemble bedding foundation. The bedding foundation has four legs, each one of which fits into a connector assembly like the connector assembly disclosed in U.S. Pat. No. 5,709,500. One drawback to this configuration is that the force exerted by a load on one of the legs is transferred directly to one of the connector assemblies which increases the odds of damaging one of the connector assemblies. If one of the connector assemblies is damaged, the damaged connector assembly will not support a leg. The entire product then will not be capable of functioning correctly and the product will no longer be raised off the ground by the legs. Each of the legs must work for the foundation to be properly supported off the ground.

It is therefore an objective of this invention to provide a bedding foundation with legs supported by a novel structure below a connector assembly.

It is further an objective of this invention to provide a bedding foundation having four legs, each of the legs aiding in securing together overlapping brackets at a corner of the product for stability.

SUMMARY OF THE INVENTION

According to one aspect of the present invention, a novel bedding foundation incorporates a stabilizer assembly used to stabilize a corner of the product and receive a leg assembly to lift the product off the ground. Each corner of the product has a stabilizer assembly below a connector assembly. The combination of a connector assembly and a stabilizer assembly joins a first truss to a second truss at a corner of the product, the second truss extending generally perpendicular to the first truss. Each of the stabilizer assemblies comprises a first bracket secured to the first truss and a second bracket secured to the second truss. One of the first and second brackets has a threaded boss and the other of the first and second brackets has a non-threaded opening aligned with the threaded boss. Each of the stabilizer assemblies further comprises a leg assembly comprising a leg and a threaded rod, the threaded rod extending through the non-threaded opening and aligned threaded boss of the first and second brackets, respectively, of the stabilizer assembly. The leg has a generally planar upper portion which abuts one of the first and second brackets to support the trusses above the ground and provide additional stability to the trusses.

The connector assembly at each of the four corners of the product joins a first truss to a second truss the first and second trusses extending perpendicular to each other. Each connector assembly further comprises first and second connector blocks, each of the connector blocks having multiple fingers. Each of the fingers has an opening through which extends a tapered pin when the fingers are aligned.

According to another aspect of the invention, an assembled foundation comprises side and trusses and a connector assembly at each of four corners of the assembled foundation for joining one of the side trusses to one of the end trusses. The side truss extends generally perpendicular to the end truss upon assembly. Each of the connector assemblies comprises a first connector block attached to one of the trusses and a second connector block attached to the other of the trusses. The first and second connector blocks each have interlocking fingers held together with a tapered pin which extends through the openings in the fingers of the connector blocks when the fingers are aligned.

A stabilizer assembly is located below the connector assembly at each of the corners of the assembled foundation. Each of the stabilizer assemblies comprises a top corner leg bracket having a threaded boss and two holes. Each of the stabilizer assemblies further comprises a bottom corner leg bracket having a non-threaded opening aligned with the threaded boss and two dowels extending through the holes in the top corner leg bracket to align the top and bottom corner leg brackets.

Each stabilizer assembly further comprises a leg assembly comprising a leg and a threaded rod, the threaded rod extending through the aligned threaded boss and non-threaded opening of the top and bottom corner leg brackets. The leg has a generally planar upper portion upon which the bottom corner leg bracket rests to support the corner of the foundation above the ground and provide additional stability to the foundation.

According to another aspect of the invention, an assembled bedding foundation comprises two side trusses and two end trusses. Each side truss comprises an upper member, a lower member, at least one spacer, end brackets and a connector block secured to each end bracket. Likewise, each end truss comprises an upper member, a lower member, at least one spacer, end brackets and a connector block secured to each end bracket. Each of the connector blocks has multiple fingers, each of the fingers having an opening.

The assembled bedding foundation further comprises four connector assemblies, one of the connector assemblies being at each of corners of the product for joining one of the side trusses to one of the end trusses. Each of the connector assemblies comprises a first connector block attached to the side truss and a second connector block attached to the end truss, the first and second connector blocks each having interlocking fingers held together with a tapered pin which extends through the openings in the fingers of the connector blocks when the fingers are aligned.

The assembled foundation further comprises a stabilizer assembly at each of the four corners of the foundation. Each of the stabilizer assemblies comprises a top corner leg bracket having a threaded boss and first and second tabs. One of the first and second tabs wraps around a portion of the lower member of one of the side trusses and the other of the first and second tabs wraps around a portion of the lower member of one of the end trusses. Each stabilizer assembly further comprises a bottom corner leg bracket having a non-threaded opening aligned with the threaded boss and first and second walls extending upwardly from a base. One of the first and second walls is outside the lower member of the one of the side trusses and the other of the first and second walls is outside the lower member of the one of the end trusses such that said first and second walls of the bottom corner leg bracket cooperate with the first and second tabs of the top corner leg bracket to fully surround the lower member of the one of the side trusses and the lower member of the one of the end trusses. Each stabilizer assembly further comprises a leg assembly comprising a leg and a threaded rod, the threaded rod extending through the aligned threaded boss and the opening of the top and bottom corner leg brackets. The leg has a generally planar upper portion upon which the bottom corner leg bracket rests to support the corner of the foundation above the ground and provide additional stability to the foundation.

According to another aspect of the invention, a ready to assemble bedding foundation comprises two side trusses and two end trusses. Each side truss comprises an upper member, a lower member, at least one spacer, end brackets and a connector block secured to each end bracket. Likewise, each end truss comprises an upper member, a lower member, at least one spacer, end brackets and a connector block secured to each end bracket. Each of the connector blocks has multiple fingers, each of the fingers having an opening.

The ready to assemble bedding foundation further comprises four tapered pins. Each tapered pin is adapted to extend through the openings in the fingers of the connector blocks when the fingers are aligned.

The ready to assemble bedding foundation further comprises four top corner leg brackets and four bottom corner leg brackets. Each of the top corner leg brackets has a threaded boss and first and second tabs. One of the tabs is sized to wrap around a portion of the lower member of one of the side trusses and the other tab is sized to wrap around a portion of the lower member of one of the end trusses. Each bottom corner leg bracket has an opening adapted to align with the threaded boss of the top corner leg bracket and first and second walls extending upwardly from a base. One of the first and second walls is adapted to fit outside the lower member of one of the side trusses and the other of the first and second walls is adapted to fit outside the lower member of one of the end trusses.

The ready to assemble bedding foundation further comprises four leg assemblies. Each leg assembly comprises a leg and a threaded rod. The threaded rod is adapted to extend through the aligned threaded boss of the top corner leg bracket and the opening of the bottom corner leg bracket. Two decking assemblies and a cover complete the ready to assembly bedding foundation. The cover has an open bottom. The cover has pieces of hook and loop fastener adapted to engage other pieces of hook and loop fastener secured to the trusses to secure the cover over the assembled foundation. Although two decking assemblies are typical any number of decking assemblies may be used including a singe one. The decking assembly or assemblies are adapted to rest on the upper members of the trusses.

The accompanying drawings, which are incorporated in and constitute a part of this specification, illustrate embodiments of the invention and, together with the summary of the invention given above, and the detailed description of the drawings given below, explain the principles of the present invention.

DETAILED DESCRIPTION OF THE INVENTION

Figure 1:
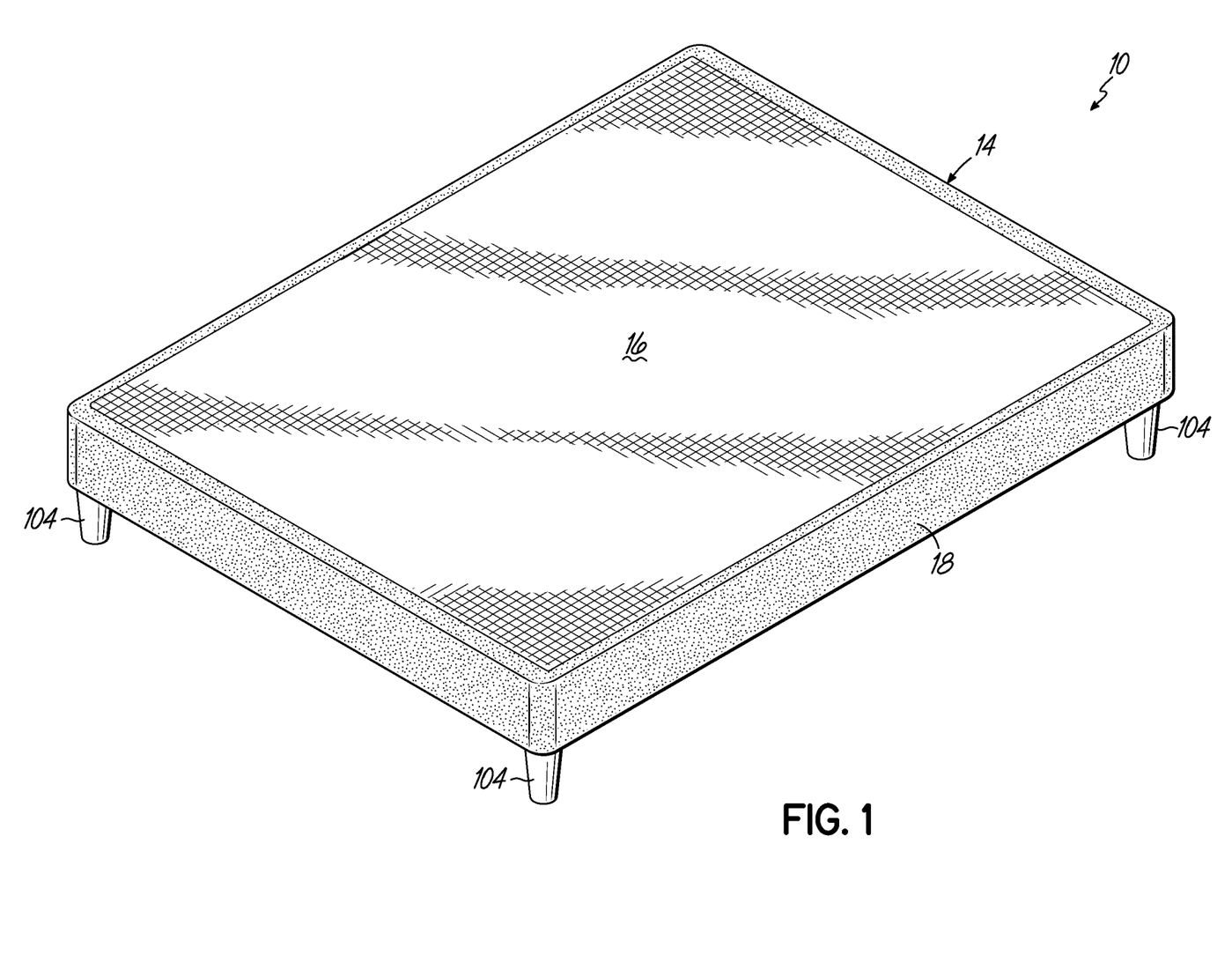
FIG. 1 is a perspective view of a ready to assemble bedding foundation fully assembled.
Figure 7:
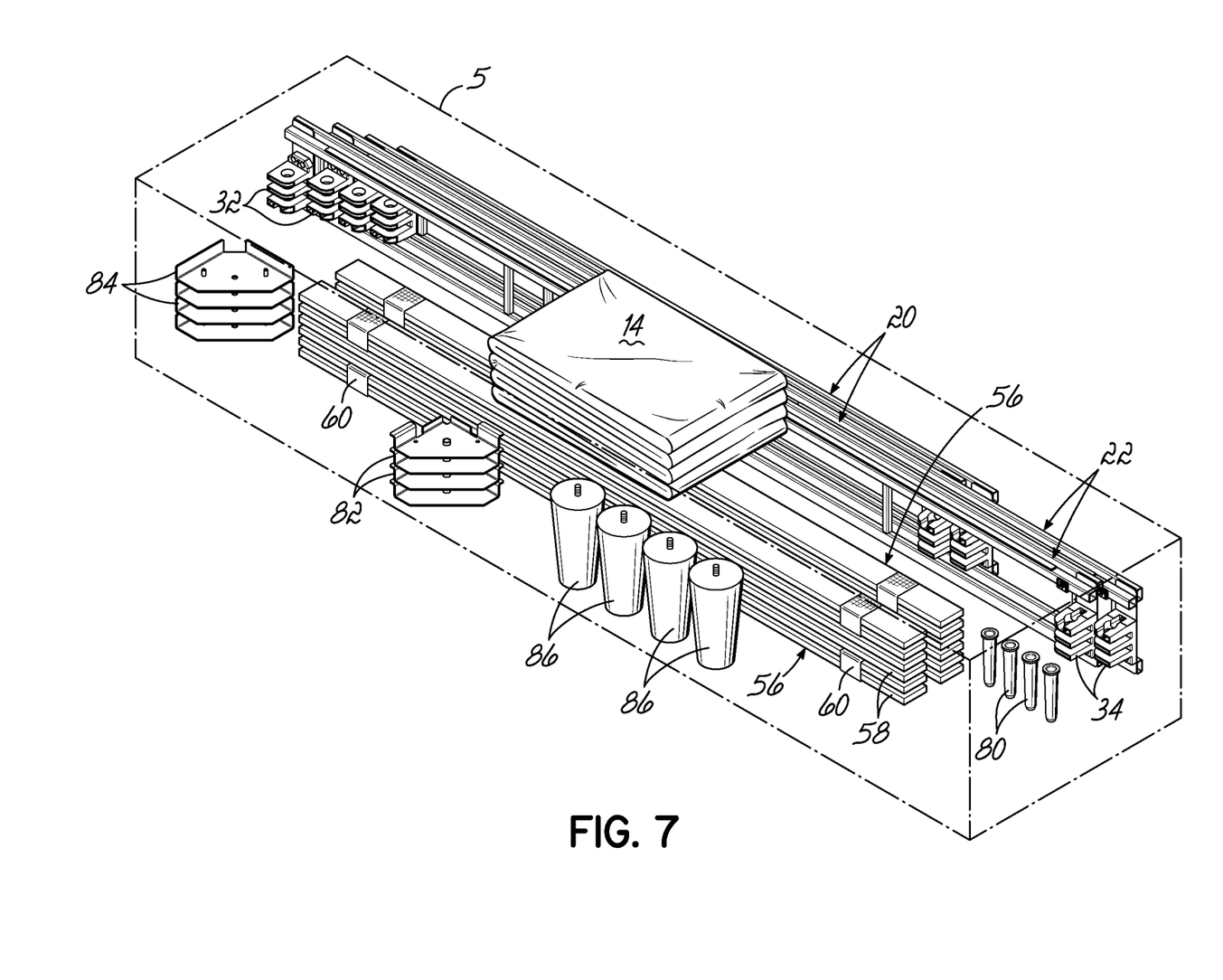
FIG. 7 is a perspective view showing the ready to assemble foundation inside a box for shipping.

Referring to the drawings, there is illustrated a bedding product in the form of a ready to assemble foundation 10 incorporating the principles of the present invention. This ready to assemble foundation 10 is shown in FIG. 1 in an assembled condition and in FIG. 7 is a disassembled condition in which it is shipped.

Figure 3A:
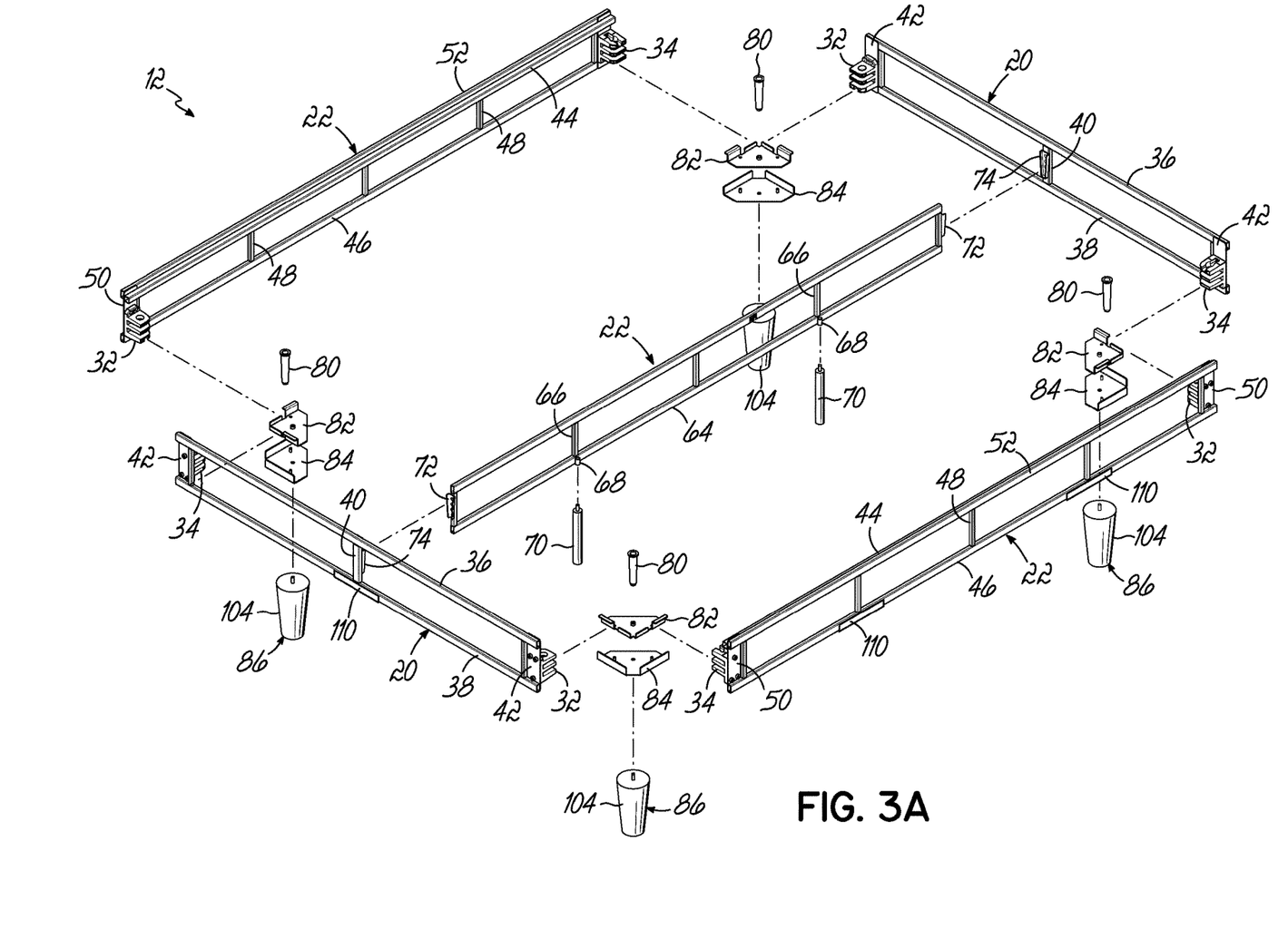
FIG. 3A is a partially exploded perspective view of the bedding foundation of FIG. 1 without the cover.
Figure 3B:
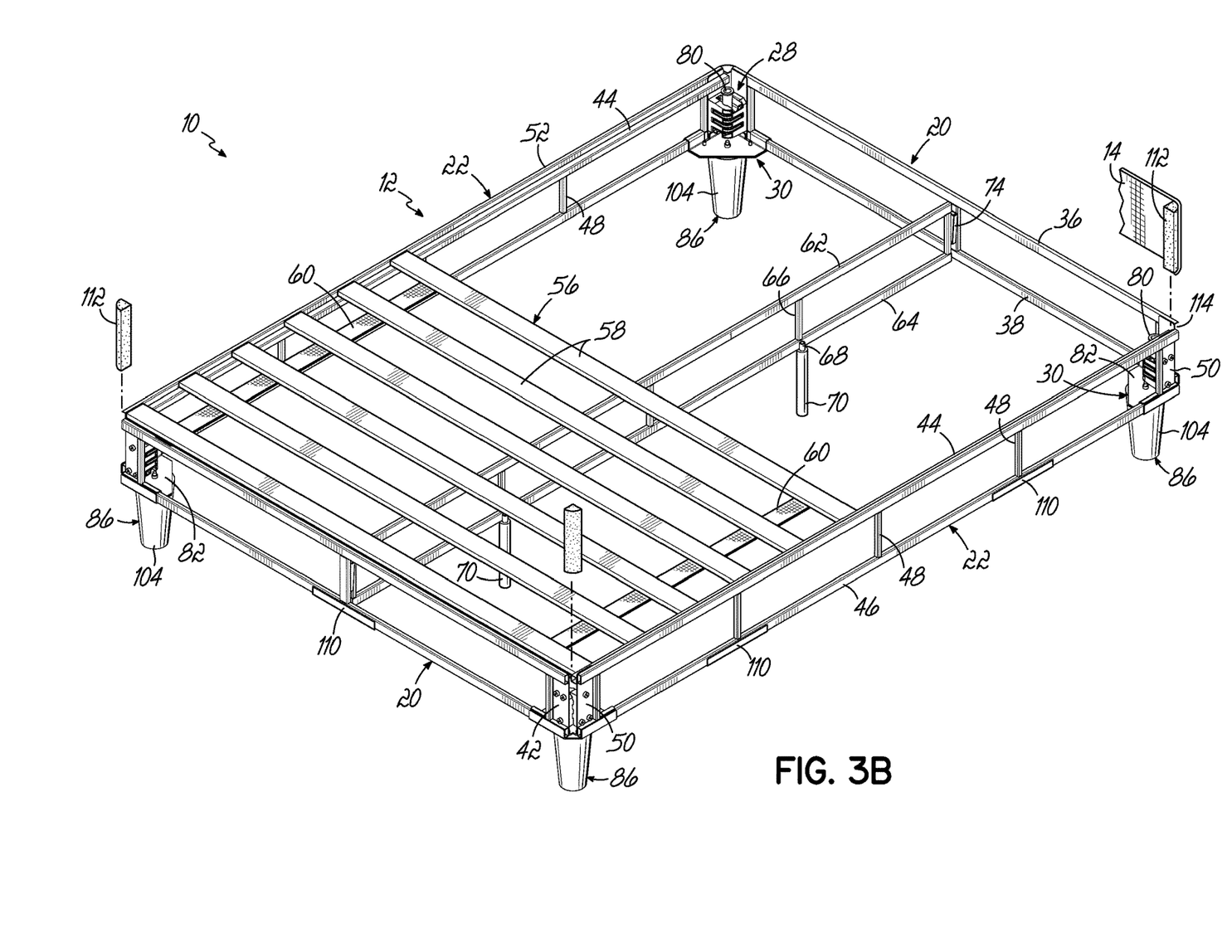
FIG. 3B is a perspective view of the bedding foundation of FIG. 1 partially assembled.

As shown in FIG. 3B, the ready to assemble foundation 10 comprises a frame 12 at least partially surrounded by an upholstered cover 14. The cover 14 has a center section 16 made of a non-skid material and a peripheral section 18 surrounding the center section 16. The upholstered cover 14 is secured to the frame 12 with hook and loop fastener pieces as described below.

Figure 2:
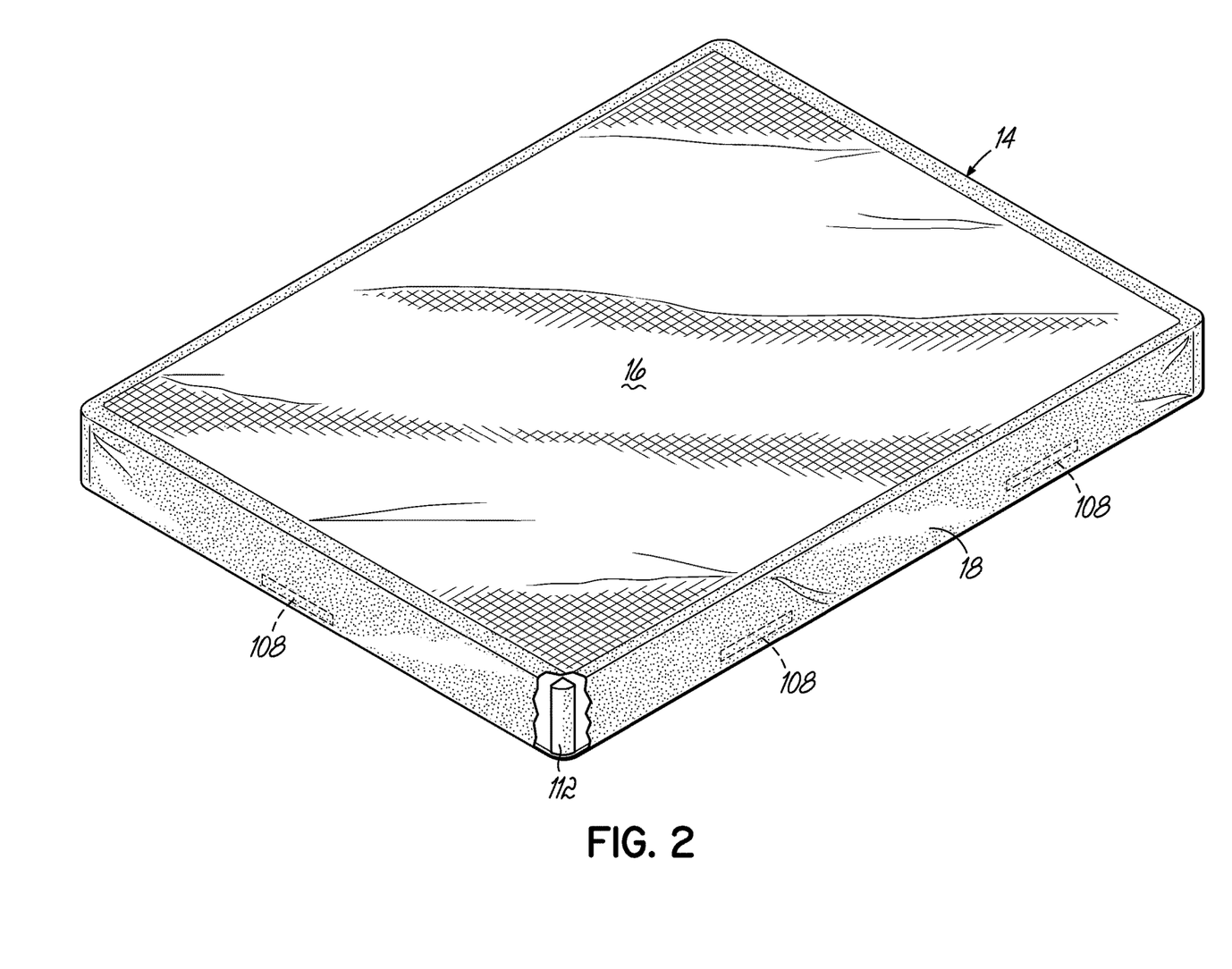
FIG. 2 is a perspective view of the cover of the bedding foundation of FIG. 1.

Referring to FIGS. 2 and 3A, the frame 12 comprises two identical end trusses 20, two identical side trusses 22 and a center truss 24. The center truss 24 is parallel the side trusses 22. The center truss 24 and side trusses 22 extend between the end trusses 20. The center truss 26 may be secured to the end trusses 20 in any known manner. Each end of each side truss 22 is secured to one of the end trusses 20 with a connector assembly 28 and a stabilizer assembly 30. The trusses 20, 22 and 24 are commonly made of metal but may be made of any desired material.

Figure 4A:
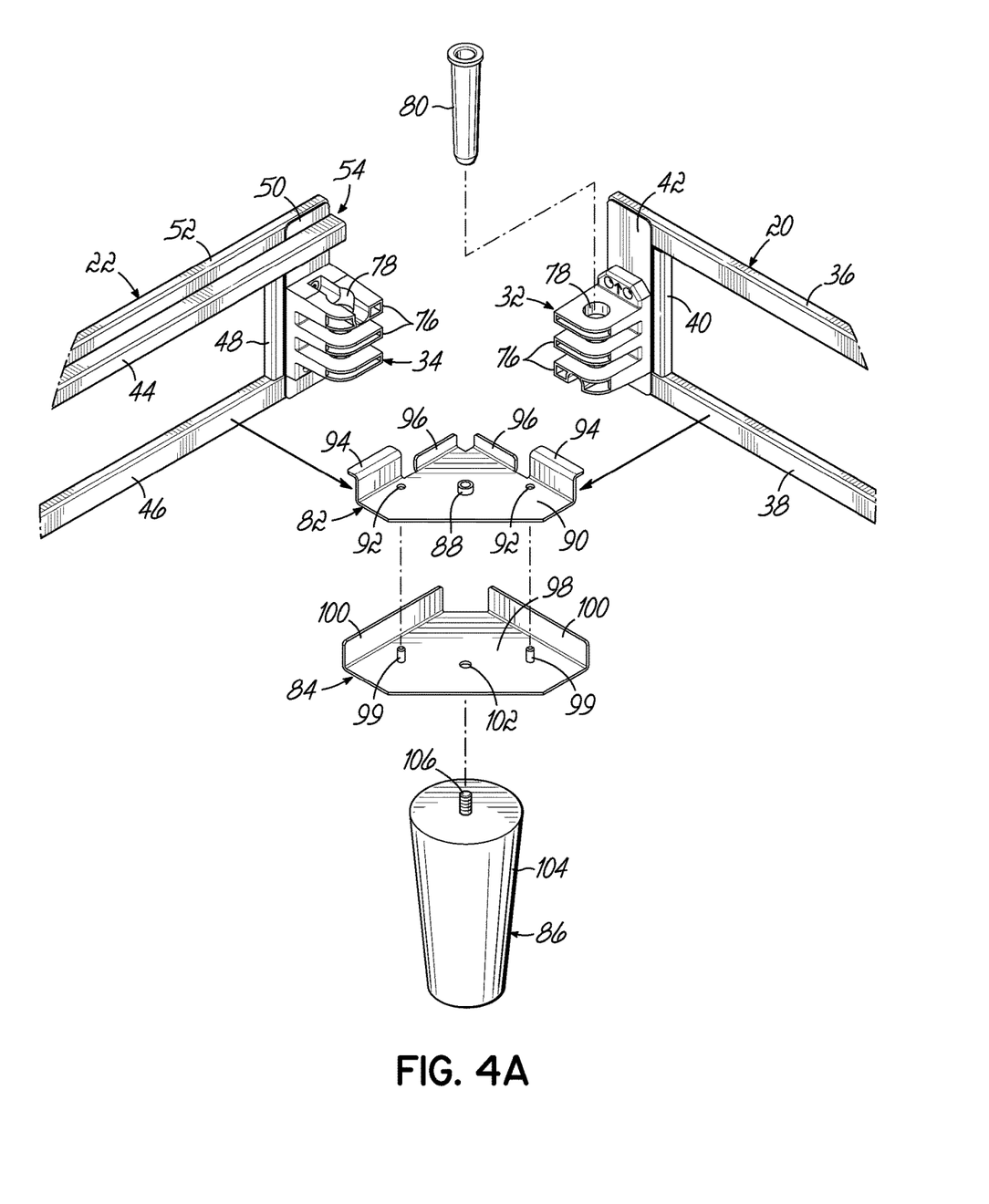
FIG. 4A is a partially exploded perspective view of one corner of the bedding foundation of FIG. 1.
Figure 4B:
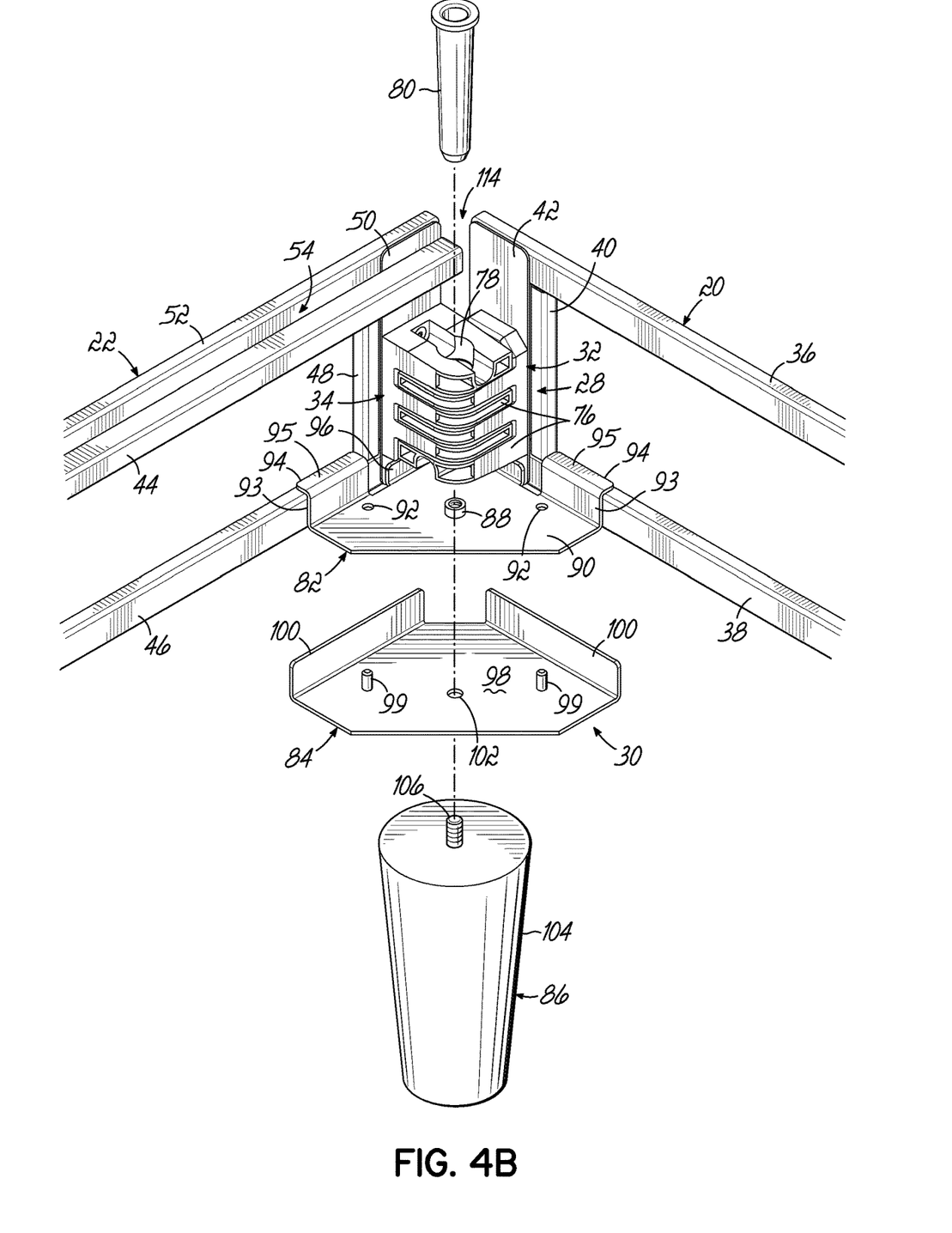
FIG. 4B is a partially exploded perspective view of the corner of the bedding foundation shown in FIG. 4A.
Figure 4C:
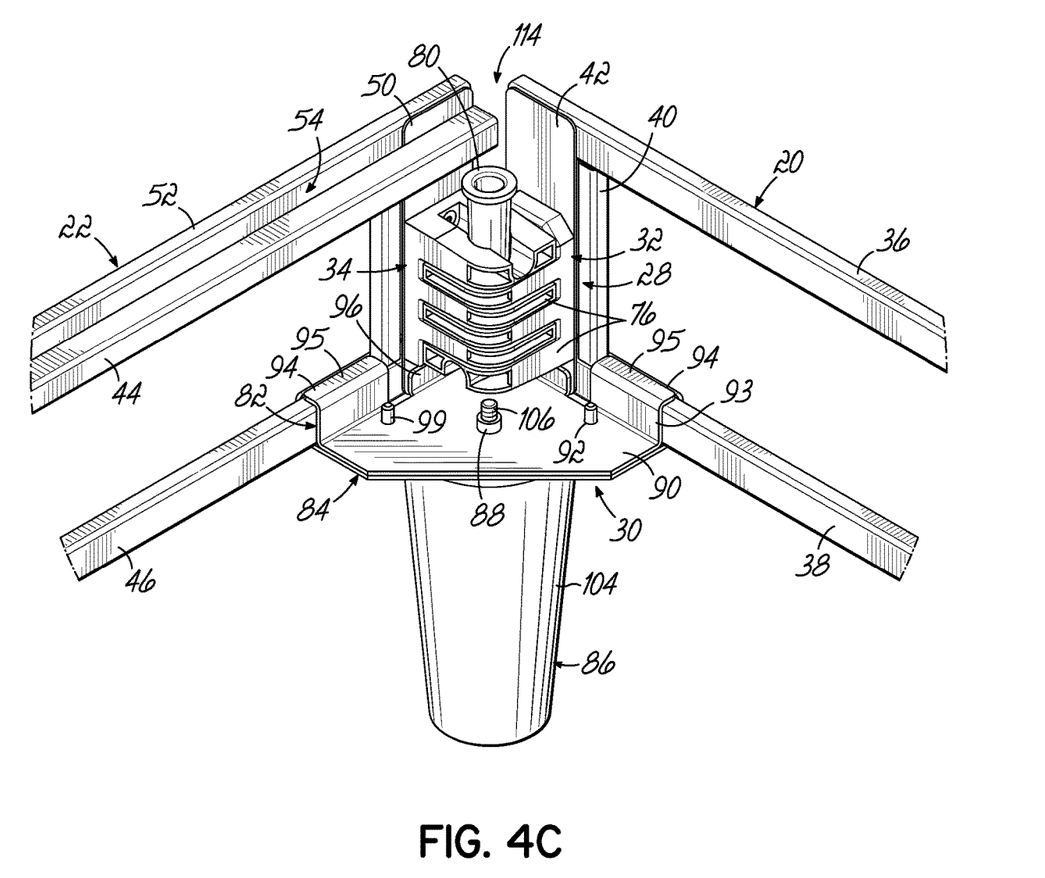
FIG. 4C is a view similar to FIG. 4B but showing the corner of the bedding foundation in an assembled condition.

As best shown in FIGS. 4A, 4B and 4C, each connector assembly 23 comprises a first connector block 32 attached to one of the end trusses 20 and a second connector block 34 attached to one of the side trusses 22. Thus, each of the end and side trusses 20 and 22 has one first connector block 32 and one second connector block 34. During construction at the manufacturer's facility, the connector blocks 32, 34 and other components described below are attached to trusses 20. In other words, all the end and side trusses are fully assembled with first and second connector blocks 32, 34 prior to shipment and final assembly of the foundation.

Each end truss 20 comprises upper and lower member 36, 38 with a middle spacer 40 and two mounting brackets 42 extending between the upper and lower members 34, 36. One of the first connector blocks 32 is secured to one of the mounting brackets 46 and one of the second connector blocks 34 is secured to the other mounting bracket 46.

Each of the side trusses 22 comprises upper and lower member 44, 46 with spacers 48 extending between the upper and lower members 44, 46. Two mounting brackets 50 on opposite sides of the spacers 48 also extend between the upper and lower members 44, 46 of each side truss 22. For each side truss 22, one of the first connector blocks 32 is secured to one of the mounting brackets 50 and one of the second connector blocks 34 is secured to the other mounting bracket 50. As best shown in FIG. 4A, each of the side trusses 22 further comprises a top member 52 which when secured to the upper member 44 creates a shelf 54. Thus, each side rail 22 has a shelf 54 (only one shown in FIG. 4A) extending along its length for supporting the slats 58 of decking assemblies 56.

As best shown in FIGS. 3A and 3B, the ready to assemble foundation 10 comprises two decking assemblies 56 (only one being shown), each decking assembly 56 comprising multiple slats 58 (six being shown) joined by straps 60 stapled to the underside of the slats 58 so each decking assembly 56 may be rolled up for shipping purposes as shown in FIG. 7. The slats 58 are commonly made of wood but may be made of plastic or any desired material.

Figure 5A:
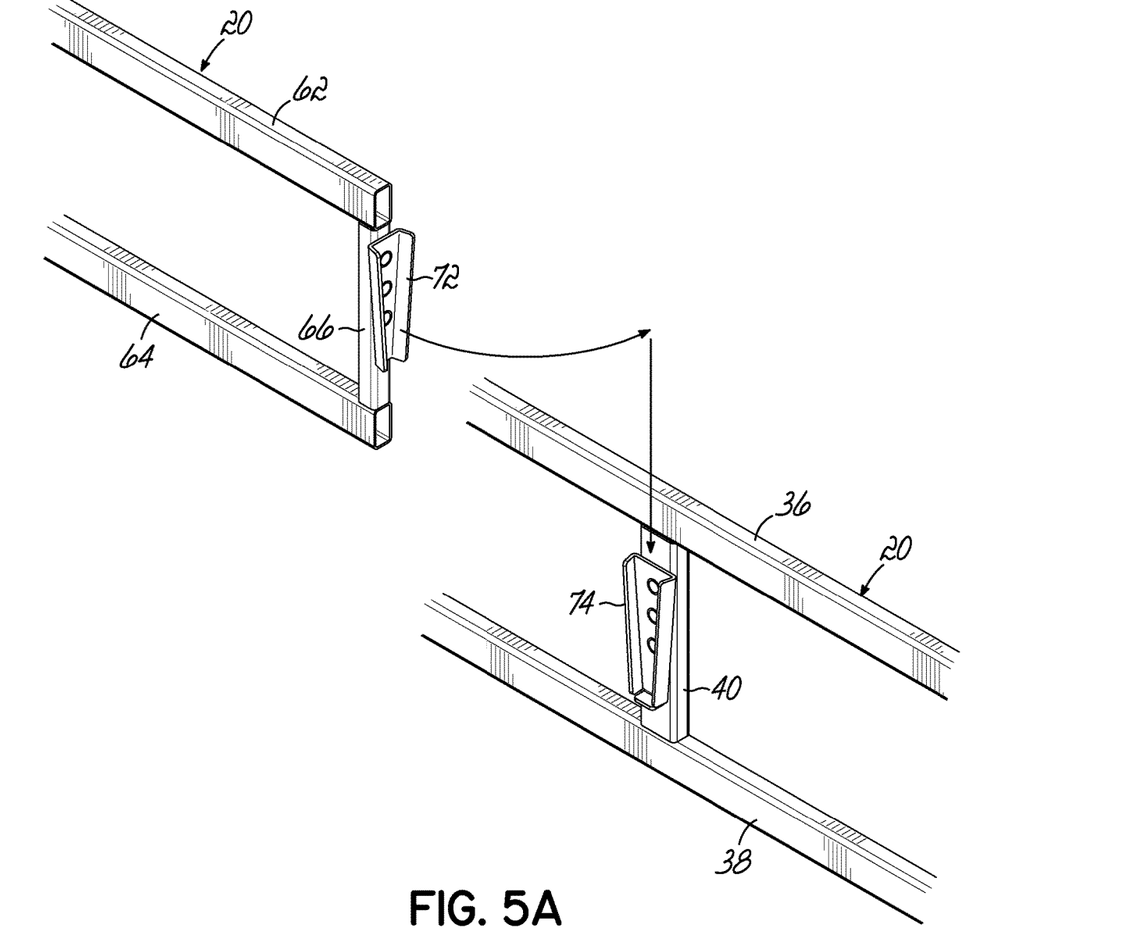
FIG. 5A is a disassembled perspective view showing the juncture of tho center truss with one of the end trusses.
Figure 5B:
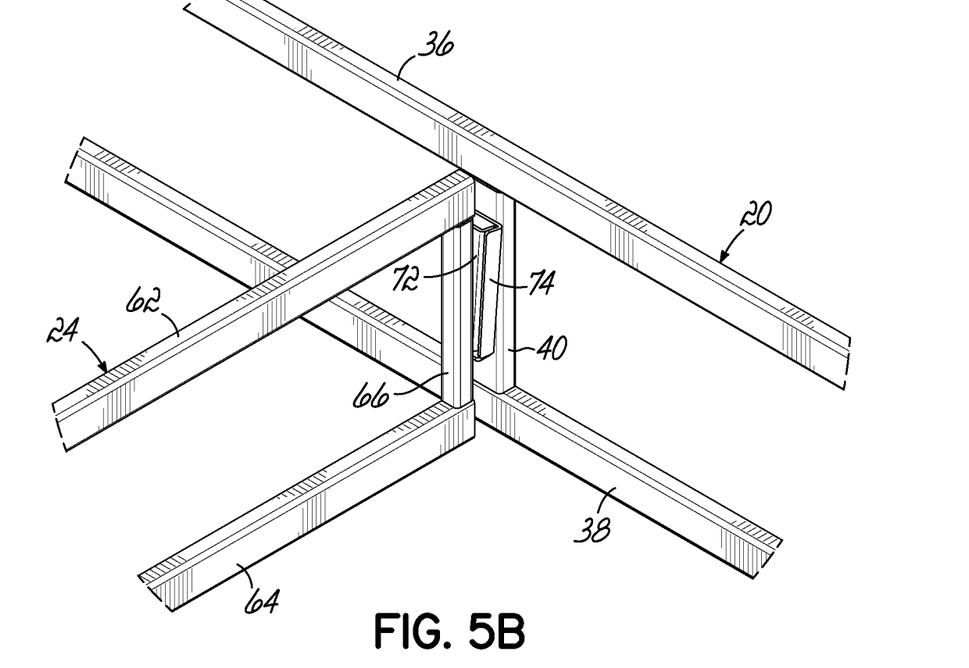
FIG. 5B is a perspective view showing one side of the center truss joined to one of the end trusses.
Figure 6:
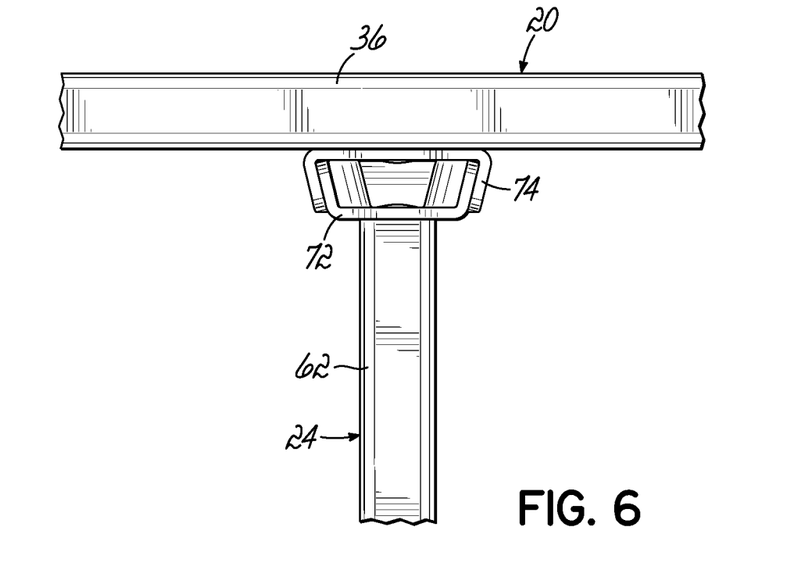
FIG. 6 is a top view of the juncture of the center truss with one of the end trusses.

The center truss 24 comprises upper and lower member 62, 64 with spacers 66 extending between the upper and lower members 62, 64. As best shown in FIG. 3A, the center truss 24 has standoff nuts 68 welded to the lower member 64 adapted to receive leg assemblies 70. As shown in FIG. 5A, a male member 72 is secured to the outermost spacer 66 at each end (only one end being shown). Each male member 72 is adapted to fit inside a female member 74 secured to the middle spacer 40 of the end truss 20.

FIGS. 4A, 4B and 4C illustrate one corner of the foundation in which one of the end trusses 20 is attached to one of the side trusses 22. As best shown in FIG. 4A, each of the connector blocks 32, 34 has three fingers 76, each finger 76 having an opening 78 through the finger 76. A tapered pin 80 extends through the openings 78 when the fingers 76 are aligned as shown in FIGS. 4B and 4C.

As shown in FIGS. 4A, 4B and 4C, each corner of the foundation 10 further comprises a stabilizer assembly 30 comprising a top corner leg bracket 82 and a bottom corner leg bracket 84 secured together with a leg assembly 86. As best shown in FIG. 4A, the top corner leg bracket 82 has a threaded boss 88 extending upwardly from a generally planar base 90 and two holes 92 extending through the generally planar base 90. The top corner leg bracket 82 further comprises first and second tabs 94 extending upwardly from the generally planar base 90 along with first and second holders 96 extending upwardly from the generally planar base 90 between the first and second tabs 94. Each of the first and second tabs 94 is generally L-shaped and integrally formed with the generally planar base 90. As best shown in FIGS. 4B and 4C, each generally L-shaped tab 94 has a vertical portion 93 adapted to contact an inside surface of the lower member 38, 46 of either an and truss 20 or a side truss 22 and a horizontal portion 95 adapted to contact an upper surface of the lower member 38, 46 of either an end truss 20 or a side truss 22. Each of the first and second holders 96 is also integrally formed with the generally planar base 90 and is generally planar and adapted to contact an inside surface of the lower member 38, 46 of either an end truss 20 or a side truss 22 for additional stability. See FIG. 4B.

As best shown in FIG. 4B, the bottom corner leg bracket 84 has a generally planar base 98 and first and second walls 100 extending upwardly from the generally planar base 90. Each of the first and second walls 100 is generally planar and integrally formed with the generally planar base 98. The generally planar base 98 also has a circular non-threaded opening 102 extending through it. The bottom corner leg bracket 84 also has two dowels 99 extending upwardly from the generally planar base 98. Each of the dowels 99 is sized to fit through one of the holes 92 in the generally planar base 90 of the first corner leg bracket 82 to align the top and bottom corner leg brackets 82, 84 when the foundation is assembled. Although each of the top and bottom corner leg brackets is illustrated as being generally triangular, it may be any other shape, such as a crescent shape or half-moon shape, for example.

As best shown in FIGS. 4A, 4B and 4C, at each corner of the foundation is a leg assembly 86 comprising a leg 104 and a threaded rod 106. The legs 104 may be made of wood, plastic, metal or any known material and may be any desired length. Upon assembly, the threaded rod 106 of the leg assembly 86 extends through the aligned circular non-threaded opening 102 of the bottom corner leg bracket 84 and into the threaded boss 88 of the top corner leg bracket 82 located above the circular non-threaded opening 102 of the bottom corner leg bracket 84. Thus, the threaded rod 106 of the leg assembly 86 extends first through the aligned circular non-threaded opening 102 of the bottom corner leg bracket 84 and then through the threaded boss 88 of the top corner leg bracket 82. As the threaded rod 106 of the leg assembly 86 is screwed in place, the top and bottom corner leg brackets 82, 84 are aligned and cinched together with the dowels 99 extending through the hole 99, providing support for the leg assembly 86 and acting to strengthen the connection between adjacent trusses. Upon assembly, the threaded rods 106 of the leg assemblies 86 do not interact with the connector assemblies 28. One of the leg assemblies 86 along with one of the stabilizer assemblies 30 may be used at each corner.

As best shown in FIG. 4C, once assembled the tabs 94 of the top corner leg bracket 82 and the walls 100 of the bottom corner leg bracket 84 cooperate to surround or wrap around and secure the lower member 38 of one of the end trusses 20 and the lower member 46 of one of the side trusses 22. This configuration of the top and bottom corner leg brackets 82, 84 provides additional stability to the foundation when the leg assemblies 86 are used to secure the top and bottom corner leg brackets 82, 84 together by inhibiting movement of the lower member 38 of one of the end trusses 20 and the lower member 46 of one of the side trusses 22. Thus, the unique configuration of the top and bottom corner leg brackets 82, 84 strengthen the connection between adjacent end and side trusses 20, 22 when secured together via the threaded rods 106 of leg assemblies 86.

As best shown in FIG. 2, the cover 14 has on its inner surface pieces of hook and loop fastener 108. Similarly, as shown in FIGS. 3A and 3B, each of the end and side trusses 20, 22 has at least one piece of hook and loop fastener 110 secured thereto via glue or any other known method. The pieces of hook and loop fastener 108, 110 interact to removably secure the cover 14 in its proper location around the assembled frame 12.

As shown in FIG. 2, a piece of foam 112 is sewn or otherwise secured to each corner of the cover 14 on the inside thereof. As shown in FIG. 3B, each such piece of foam 112 inside cover 14 is adapted to fit inside a gap 114 located at one of the corners of the assembled foundation between an end truss 20 and a side truss 22.

As shown in FIG. 7, all the components of the ready to assemble foundation 10 come packaged in a small box or container 5 shown in dashed lines. The configuration of the components enables the trusses and corner leg brackets to be stacked together to save valuable space inside the container 5. Smaller containers are cheaper to ship, thereby the configuration of the present invention reduces the shipping cost to a customer which may allow the manufacturer to sell the ready to assemble foundation at a lower price.

One advantage of the present invention is that a customer may receive the product in a box via the mail or a common carrier and assemble the bedding foundation quickly and easily resulting in an upholstered, attractive product without the use of tools. The open interiors of the trusses enable multiple trusses to be stacked together as shown in FIG. 7, saving space and enabling the ready to assembly foundation 10 to be shipped in a smaller container than if the trusses were not stacked. The end and side trusses 20 and 22 are shipped to a consumer with the first and second connector blocks 30, 32 already attached. To fully assemble the foundation, a consumer only has to align the connector blocks 32, 34 at each corner of the foundation, insert the tapered pins 80 through the aligned openings 78 in the connector blocks 32, 34 and screw in the leg assemblies 86 as described above to secure a stabilizer assembly at each corner.

The various embodiments of the invention shown and described are merely for illustrative purposes only, as the drawings and the description are not intended to restrict or limit in any way the scope of the claims. Those skilled in the art will appreciate various changes, modifications, and improvements which can be made to the invention without departing from the spirit or scope thereof. The invention in its broader aspects is therefore not limited to the specific details and representative apparatus and methods shown and described. Departures may therefore be made from such details without departing from the spirit or scope of the general inventive concept. The invention resides in each individual feature described herein, alone, and in all combinations of those features. Accordingly, the scope of the invention shall be limited only by the following claims and their equivalents.

What is claimed is:

1. An assembled bedding foundation comprising:
    side trusses;
    end trusses;
    a connector assembly at each of four corners of the foundation for joining one of the side trusses to one of the end trusses, said one of the side trusses extending generally perpendicular to said one of the end trusses, each connector assembly comprising first and second connector blocks, each of the connector blocks being secured to one of the trusses and having multiple fingers, each of the fingers having an opening;
        a tapered pin extending through the openings in the fingers of the connector blocks when the fingers are aligned;
        a stabilizer assembly at each of the four corners of the foundation, each of the stabilizer assemblies comprising a top corner leg bracket having a threaded boss and two holes, a bottom corner leg bracket having a non-threaded opening aligned with the threaded boss and two dowels, the dowels extending through the holes in the top corner leg bracket to align the top and bottom corner leg brackets,
    wherein said stabilizer assembly further comprises a leg assembly comprising a leg and a threaded rod, the threaded rod extending through the aligned threaded boss and non-threaded opening of the top and bottom corner leg brackets.

2. The foundation of claim 1 wherein the top corner leg bracket has first and second tabs, one of the first and second tabs wrapping around a portion of said one of the side trusses and the other of the first and second tabs wrapping around a portion of said one of the end trusses.

3. The foundation of claim 1 wherein the bottom corner leg bracket has first and second walls extending upwardly from a base, one of the first and second walls being outside a portion of said one of the side trusses and the other of the first and second walls being outside a portion of said one of the end trusses.

4. The foundation of claim 1 wherein the side and end trusses are metal.

5. The foundation of claim 1 further comprising a center truss having standoff nuts adapted to receive additional leg assemblies.

6. The foundation of claim 5 wherein each of the standoff nuts is welded to a lower member of the center truss.

7. The foundation of claim 1 further comprising decking made of wooden slats connected by canvas straps.

8. The foundation of claim 7 further comprising a cover secured to the trusses with hook and loop fasteners.

9. The foundation of claim 1 further comprising a cover having foam pieces adapted to fit in gaps at the corners of the assembled foundation.

10. An assembled bedding foundation comprising:
    two side trusses, each side truss comprising an upper member, a lower member, at least one spacer, end brackets and a connector block secured to each end bracket, each of the connector blocks having multiple fingers, each of the fingers having an opening;
    two end trusses, each end truss comprising an upper member, a lower member, at least one spacer, end brackets and a connector block secured to each end bracket, each of the connector blocks having multiple fingers, each of the fingers having an opening;
    a connector assembly at each of four corners of the foundation for joining one of the side trusses to one of the end trusses, each connector assembly comprising first and second connector blocks;
        a tapered pin extending through the openings in the fingers of the connector blocks when the fingers are aligned;
        a stabilizer assembly at each of the four corners of the foundation, each of the stabilizer assemblies comprising a top corner leg bracket having a threaded boss and first and second tabs, one of the first and second tabs wrapping around a portion of the lower member of said one of the side trusses and the other of the first and second tabs wrapping around a portion of the lower member of said one of the end trusses,
    said stabilizer assembly further comprising a bottom corner leg bracket having a non-threaded opening aligned with the threaded boss and first and second walls extending upwardly from a base, one of the first and second walls being outside the lower member of said one of the side trusses and the other of the first and second walls being outside the lower member of said one of the end trusses such that said first and second walls of said bottom corner leg bracket cooperate with said first and second tabs of said top corner leg bracket to fully surround the lower member of said one of the side trusses and the lower member of said one of the end trusses, said stabilizer assembly further comprises a leg assembly comprises a leg and a threaded rod, the threaded rod extending through the aligned threaded boss and non-threaded opening of the top and bottom corner leg brackets and the leg abuts the bottom corner leg bracket to assist supporting the foundation above the ground.

11. The foundation of claim 10 wherein said bottom corner leg bracket has two dowels extending through holes in the top corner leg bracket to align the top and bottom corner leg brackets.

12. The foundation of claim 10 wherein each of the top and bottom corner leg brackets of each of the stabilizer assemblies is made of metal.

13. The foundation of claim 10 further comprising a center truss having standoff nuts adapted to receive additional leg assemblies.

14. The foundation of claim 13 wherein each of the standoff nuts is welded to a lower member of the center truss.

15. The foundation of claim 10 further comprising decking made of wooden slats connected by canvas straps.

16. A ready-to-assemble bedding foundation capable of being shipped in a box, said ready-to-assemble foundation comprising:

two side trusses, each side truss comprising an upper member, a lower member, at least one spacer, end brackets and a connector block secured to each end bracket, each of the connector blocks having multiple fingers, each of the fingers having an opening;

two end trusses, each end truss comprising an upper member, a lower member, at least one spacer, end brackets and a connector block secured to each end bracket, each of the connector blocks having multiple fingers, each of the fingers having an opening;

four tapered pins, each tapered pin being adapted to extend through the openings in the fingers of the connector blocks when the fingers are aligned;

four top corner leg brackets, each top corner leg bracket having a threaded boss and first and second tabs, each of the tabs being sized to wrap around a portion of the lower member of said one of the side trusses and the other of the first and second tabs being sized to wrap around a portion of the lower member of said one of the end trusses;

four bottom corner leg brackets, each bottom corner leg bracket having an opening adapted to align with the threaded boss and first and second walls extending upwardly from a base, one of the first and second walls being adapted to fit outside the lower member of said one of the side trusses and the other of the first and second walls being adapted to fit outside the lower member of said one of the end trusses;

four leg assemblies, each leg assembly comprising a leg and a threaded rod, the threaded rod being adapted to extend through an aligned threaded boss of a top corner leg bracket and an opening of a bottom corner leg bracket, two decking assemblies, each decking assembly comprising multiple slats connected by straps; and a cover having an open bottom.

17. The ready-to-assemble bedding foundation of claim 16 wherein the first and second tabs of each of the top corner leg brackets are adapted to mate with the first and second walls of one of the bottom corner leg brackets to fully surround one of the lower members of one of the side and end trusses.

18. The ready-to-assemble bedding foundation of claim 16 wherein the opening in the bottom corner leg bracket is non-threaded.

19. The ready-to-assemble bedding foundation of claim 16 wherein the cover has hook and loop fastener pieces adapted to engage hook and loop fastener pieces on the side and end trusses.

20. The ready-to-assemble bedding foundation of claim 16 wherein the cover has foam pieces adapted to fit in gaps at the corners of the foundation upon assembly.

* * * * *